United States Patent
El-Raghy et al.

(10) Patent No.: US 7,217,907 B2
(45) Date of Patent: May 15, 2007

(54) STICK RESISTANT COOKING UTENSILS

(75) Inventors: Tamer El-Raghy, Voorhees, NJ (US); Patricia Lyons, Moorestown, NJ (US)

(73) Assignee: 3-One-2 LLC, Voorhees, NJ (US)

( * ) Notice: Subject to any disclaimer, the term of this patent is extended or adjusted under 35 U.S.C. 154(b) by 76 days.

(21) Appl. No.: 10/970,880

(22) Filed: Oct. 22, 2004

(65) Prior Publication Data

US 2005/0112414 A1     May 26, 2005

Related U.S. Application Data

(60) Provisional application No. 60/535,862, filed on Jan. 12, 2004, provisional application No. 60/513,357, filed on Oct. 22, 2003.

(51) Int. Cl.
    *H05B 6/12*      (2006.01)
(52) U.S. Cl. ........................ 219/621; 428/698
(58) Field of Classification Search ............... 428/698; 219/621
See application file for complete search history.

(56) References Cited

U.S. PATENT DOCUMENTS

| | | | |
|---|---|---|---|
| 5,882,561 A | 3/1999 | Barsoum et al. | 264/65 |
| 5,942,455 A | 8/1999 | Barsoum et al. | 501/91 |
| 6,461,989 B1 | 10/2002 | El-Raghy et al. | 501/87 |
| 6,906,295 B2 * | 6/2005 | Ge | 219/621 |
| 6,942,935 B2 * | 9/2005 | Ge | 428/698 |
| 2003/0022027 A1 | 1/2003 | Groll | 428/698 |
| 2003/0047029 A1 | 3/2003 | Hansz et al. | 75/230 |
| 2003/0075251 A1 | 4/2003 | Sundberg et al. | 148/688 |

FOREIGN PATENT DOCUMENTS

| | | | |
|---|---|---|---|
| AU | 2000 49627 B2 | | 4/2000 |
| DK | 989199 T | | 7/2002 |
| EP | 870458 | * | 9/1998 |
| EP | 0 989 198 A1 | | 3/2000 |
| EP | 0 989 199 B1 | | 4/2002 |
| EP | 1242333 | | 9/2002 |
| EP | 1378304 | * | 1/2004 |
| JP | 63-3818 | * | 1/1988 |
| WO | WO 00/71768 A1 | | 11/2000 |
| WO | WO 03/051791 A1 | | 6/2003 |

* cited by examiner

*Primary Examiner*—Archene Turner
(74) *Attorney, Agent, or Firm*—Licata & Tyrrell P.C.

(57) ABSTRACT

Durable, stick resistant, stain resistant, dishwasher safe, and thermal shock resistant cooking utensils produced from a MAX phase and methods for their production are provided.

4 Claims, No Drawings

STICK RESISTANT COOKING UTENSILS

INTRODUCTION

This patent application claims the benefit of priority to U.S. Provisional Patent Application Ser. No. 60/535,862 filed Jan. 12, 2004 and U.S. Provisional Patent Application Ser. No. 60/513,357, filed Oct. 22, 2003, each of which is herein incorporated by reference in its entirety.

FIELD OF THE INVENTION

This invention relates to durable, stick resistant, stain resistant, dishwasher safe, and thermal shock resistant cookware, cutlery and other cooking utensils comprising a MAX phase.

BACKGROUND OF THE INVENTION

Cookware with a stick resistant surface is used daily by millions of households worldwide. Desirable characteristics in a stick resistant coating of cookware include good food release properties without affecting the taste of food, thermal stability at temperatures as high as 700° F., strong bonding with the substrate, environment compatibility and economic feasibility.

There are several stick resistant surfaces currently in use.

For example, DuPont produces an organic surface TEFLON® with excellent food release properties. Typically, a TEFLON® coating is applied to aluminum cookware. The aluminum provides for excellent heat conductivity while the TEFLON® provides excellent food release properties. However, TEFLON®-based stick resistant surfaces are soft and easy to scratch. A metal utensil, if used against a TEFLON®-coated surface, leaves a scar. Some cleaning utensils also leave scratches. While attempts have been made to provide TEFLON®-based stick resistant surfaces with increased scratch resistance, i.e. Calphalon One, such surfaces are still susceptible to scratching. Once the TEFLON®-based stick resistant surface is scratched, the stick resistant properties of the surface deteriorate. Further, and more importantly, TEFLON® begins to be released to the surrounding environment and into the human body. Recently, several research groups have shown that some chemicals used in making TEFLON® represent a health hazard. In particular, perfluorooctanoic acid (PFOA), a chemical used to make TEFLON®, has been detected in people as well as animals worldwide. PFOA has been detected in river otters in Oregon, polar bears in the Canadian Arctic, and in the blood of 96 percent of children tested in 23 states (Philadelphia Inquirer, Sep. 19, 2004). According to the U.S. Environmental Protection Agency, this chemical used to produce the stick resistant coating on pots and pans is hazardous to children and women of childbearing age, according to the U.S. Environmental Protection Agency (see EPA with the extension .gov of the world wide web). Further, cooking with TEFLON® has been reported to make a person sick with a temporary flu if a stick resistant pan gets overheated (see ewg with the extension .org of the world wide web). Birds have also been reportedly killed in houses where TEFLON® coated cookware was used (see ewg with the extension .org of the world wide web).

A hard anodized aluminum cookware is produced by Calphalon. Anodizing is a process by which a layer of extremely hard, but porous, aluminum oxide is applied to the surface of aluminum. This layer protects food from bare aluminum and helps protect the surface from wear. While marketed as a stick resistant coating, in reality use of a considerable amount of cooking oil and/or fat is required for food not to stick to this cookware. Further, at microscale levels, this layer is sponge-like in structure and can not be placed in the dishwasher because dishwashing detergent attaches to the layer causing permanent stains and deterioration of the integrity of the layer.

Recently, to over come the poor food release properties and the sponge-like structure, Calphalon released a new product, Calphalon One. In this product, the aluminum is anodized and the sponge-like layer is filled with TEFLON®. However, the presence of TEFLON® in this product represents the same concerns discussed above. Further, this newer product is still not dishwasher safe.

Scanpan is a Danish manufacturer specializing in durable cookware produced using different materials solutions as well as different surface coating techniques. Their cookware line consists of a combination of aluminum and titanium to provide a durable cookware. Recently they introduced a surface coating that combines the durability of ceramics and the excellent stick resistant properties of TEFLON® (Danish Patent DK989199T). However, while this surface is more scratch resistance because of the innovative ceramic coating, the use of TEFLON® as the final layer to provide stick resistant properties is still a concern.

Published U.S. patent application Ser. No. 2003/0022027 discloses a stick resistant cook surface comprising a substrate metal selected from stainless steel, carbon steel or titanium with a layer of ceramic nitride applied to the substrate metal.

Cast iron has a natural excellent food release properties due to its chemistry and microstructure. Further, it is thermally stable and can be used with metal utensils. However, cast iron cookware is extremely heavy requiring a strong arm to handle a 12 inch cast iron skillet. Cast iron cookware also rusts easily if not kept very dry all the time.

Thus, there is a need for an environmentally friendly stick resistant coating for cookware, cutlery and other cooking utensils.

A ternary ceramic material comprising $M_{n+1}AX_n$ (n=1,2, 3) wherein M is a metal selected from the groups IIIB, IVB, VB, VIB and VIII of the periodic table of elements and/or their mixture; wherein A is selected from the groups IIIA, IVA, VA and VIA of the periodic table of elements and/or their mixture, and wherein X is carbon and/or nitrogen is described in U.S. Pat. No. 5,882,561, U.S. Pat. No. 5,942,455 and U.S. Pat. No. 6,461,989.

Use of this ternary ceramic material to produce slip-casted article formers such as latex gloves and condoms is described in WO 03/051791. Use of this ternary ceramic material in handling molten metals is described in DE60013322D. Use of this ternary ceramic material in resistance heating elements is described in AU774202.

SUMMARY OF THE INVENTION

An object of the present invention is to provide a stick resistant cook surface comprising a MAX phase.

Another object of the present invention is to provide a stick resistant cooking utensil, said utensil comprising a MAX phase.

Another object of the present invention is to provide a stick resistant cooking utensil comprising a conventional metal cooking utensil coated at least in part with a MAX phase.

Another object of the present invention is to provide a method for producing a stick resistant cooking utensil comprising a MAX phase.

Yet another object of the present invention is to provide a method for producing a stick resistant cooking utensil which comprises coating a conventional metal cooking utensil with a MAX phase.

DETAILED DESCRIPTION OF THE INVENTION

The present invention relates to cooking utensils and methods of producing cooking utensils which are durable, stick resistant, stain resistant, dishwasher safe, and thermal shock resistant and which comprise a MAX phase.

By "MAX phase" as used herein it is meant a material comprising $M_{n+1}AX_n$ (n=1,2,3) wherein M is a metal selected from the groups IIIB, IVB, VB, VIB and VIII of the periodic table of elements and/or their mixture; wherein A is selected from the groups IIIA, IVA, VA and VIA of the periodic table of elements and/or their mixture, and wherein X is carbon and/or nitrogen.

MAX phase possesses a low friction coefficient and is thermally very stable. It is manufactured at temperatures higher than 2600° F. with Ti as more than 70% of its constituents and no organic substances being involved at any step of the process. As shown herein, its low friction coefficient makes it difficult for food to stick while its hardness makes it very difficult to be scratched using metals utensils. Further, cytotoxicity testing has shown MAX phases to be inert.

By "cooking utensil" as used herein, it is meant to include any conventional tool used in food preparation wherein a stick resistant surface is desired. Examples include, but are in no way limited to, cookware such as fry pans, sauce pans, saute pans, stock pots, woks, and omelet pans, bakeware such as cookie sheets, loaf pans, casserole dishes, pie plates and cake pans, indoor and outdoor grills and griddles and other food preparation surfaces, measuring cups and mixing bowls, cutlery, spatulas, and spoons and other mixing apparatus. When used in cutlery, the MAX phase maintains sharpness of the knife blade over time while the nonstick characteristics of the MAX phase prevent food from sticking to the knife blade.

In one embodiment, a cooking utensil of the present invention comprises the MAX phase. Various methods for machining of a MAX phase into a cooking utensil can be used. In one embodiment, a MAX phase cooking utensil is produced by first molding a MAX phase into a desired shape, preferably by cold isostatically pressing a MAX phase powder into a desired mold, and then sintering the molded MAX phase to full density. The sintered piece is then machined into the form of the desired cooking utensil. The surface of the cooking utensil was then polished. As shown herein a cooking utensil comprising a MAX phase was durable, stick resistant, stain resistant, dishwasher safe, and thermal shock resistant.

In another embodiment of the present invention the cooking utensil itself is made of a conventional substrate such as aluminum, copper, stainless steel, carbon steel or titanium and then coated with a MAX phase. In this embodiment, the MAX phase coating may be applied to the entire cooking utensil or alternatively only to the food contacting surface. Following application of the MAX phase coating, the coating is preferably polished. Applying a MAX phase in the form of a smooth coating on the food contacting surface of conventional cookware, on the blade of a knife or other form of cutlery or the surface of another cooking utensil in contact with food results in similar durable, stick resistant, stain resistant, dishwasher safe, and thermal shock resistant characteristics to those found for cooking utensils comprised of the MAX phase. The MAX phase comprising coating can be applied by any conventional method including, but not limited to, thermal spraying, chemical vapor deposition and physical vapor deposition. Application of a MAX phase coating to a cooking utensil is expected to satisfy requirements of the Food and Drug Association for coated cooking utensils.

In the cooking utensils of the present invention, the MAX phase preferably comprises the majority of the material used to produce the cooking utensil or to coat the cooking utensil. However, as will be understood by those of skill in the art upon reading this disclosure, the combination of heat and/or the presence of oxygen in methods for production such as thermal coating of a cooking utensil, may result in changes to the chemical properties and/or crystal structure of the starting MAX phase material. Thus, in addition to the MAX phase, the coating on a cooking utensil may also comprise oxides, nitrides and carbides.

Exemplary MAX phases for use in the present invention include, but are in no way limited to, $Ti_3SiC_2$ and $Ti_2AlC$.

The following nonlimiting example is provided to further illustrate the present invention.

EXAMPLE

A 6 inch cooking pan comprising the MAX phase $Ti_3SiC_2$ was produced by cold isostatically pressing a MAX phase powder into a cylindrical mold and sintering the resulting green body to full density. The sintered piece was then machined in the form of a frying pan. The cooking surface of the pan was polished using 1200 grit paper. The pan was then heated up on the top of a stove. With no or a little bit of oil, the pan was used to burn egg, rice, applesauce, blue berries and tomato sauce.

The pan showed excellent stick resistant behavior and good food release properties.

The pan was easily cleaned by washing it with clean cold water while still hot. Soaking the pan over night in dishwasher detergent left no mark on the smooth surface of the pan. Placing the pan in the dishwasher for 4 cycles left no evidence of degradation on the smooth surface of the pan. No stains remained after cleaning and the surface looked intact.

During all tests, metal utensils were used. The pan exhibited excellent scratch resistance believed to be due to the low friction coefficient MAX phases.

A 10" aluminum pan coated with the MAX phase Ti3SiC2 was also produced. The MAX phase coating exhibited excellent adhesion to the conventional cooking utensil and was resistant to scratches.

Analysis of thermally sprayed MAX phase coatings wherein the starting MAX phase was $Ti_3SiC_2$ or $Ti_2AlC$ has shown the coatings to comprise the MAX phase, TiC, as well as some oxides, with the overall oxygen content reaching up to 15% wt in some coating.

As will be understood by those of skill in the art upon reading this disclosure, the scope of this invention is not meant to be limited to the specific cooking utensils exemplified herein, but rather is meant to be inclusive of any cooking utensils which can take advantage of any of the characteristics of durabilitiy, stick resistant, stain resistance, dishwasher safe, and thermal shock resistance of these MAX phase materials.

What is claimed is:

1. A stick resistant cook surface comprising a thermally stable ternary ceramic material $M_{n+1}AX_n$ wherein M comprises a metal or a mixture of metals selected from the group consisting of groups IIIB, IVB, VB VIB and VIII of the periodic table of elements;

A is an element or mixture of elements selected from the group consisting of groups IIIA, IVA, VA and VIA of the periodic table of elements;

X is selected from the group consisting of carbon, nitrogen and carbon and nitrogen; and n is 1, 2 or 3.

2. A cooking utensil, said utensil comprising the stick resistant cook surface of claim 1.

3. The cooking utensil of claim 2 wherein the stick resistant cook surface is applied as a coating to a conventional metal cooking utensil.

4. The cooking utensil of claim 3 wherein the coating is applied to a food contacting surface of the conventional metal cooking utensil.

* * * * *